United States Patent
Blake et al.

(10) Patent No.: US 12,460,597 B2
(45) Date of Patent: Nov. 4, 2025

(54) LOCATION-BASED MODIFICATION OF TWO-STROKE ENGINE CALIBRATION

(71) Applicant: Polaris Industries Inc., Medina, MN (US)

(72) Inventors: Dallas Blake, Roseau, MN (US); Darren J. Hedlund, Roseau, MN (US); Ryan Douglas Hayes, East Grand Forks, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/904,113

(22) Filed: Oct. 2, 2024

(65) Prior Publication Data

US 2025/0116239 A1 Apr. 10, 2025

Related U.S. Application Data (60) Provisional application No. 63/587,823, filed on Oct. 4, 2023.

(51) Int. Cl.
*F02D 41/24* (2006.01)
*F02D 9/08* (2006.01)
*F02D 13/02* (2006.01)

(52) U.S. Cl.
CPC .......... *F02D 41/2464* (2013.01); *F02D 9/08* (2013.01); *F02D 13/0242* (2013.01); *F02D 2200/0404* (2013.01); *F02D 2200/101* (2013.01); *F02D 2400/04* (2013.01)

(58) Field of Classification Search
CPC .... F02D 41/2464; F02D 9/08; F02D 13/0242; F02D 2200/0404; F02D 2200/101; F02D 2400/04; F02D 11/105; F02D 41/021; F02D 9/04; F02D 41/2422; F02D 2200/701
See application file for complete search history.

(56) References Cited

U.S. PATENT DOCUMENTS

| | | | |
|---|---|---|---|
| 8,590,654 B2 | 11/2013 | Kerner et al. | |
| 8,733,773 B2 | 5/2014 | Sampson | |
| 11,110,994 B2 | 9/2021 | Hedlund | |
| 11,635,046 B1* | 4/2023 | Klingbeil | F02D 19/10 261/19 |
| 2014/0332293 A1 | 11/2014 | Conn | |
| 2019/0376459 A1* | 12/2019 | Pieczko | F02D 13/06 |

* cited by examiner

*Primary Examiner* — Hung Q Nguyen
(74) *Attorney, Agent, or Firm* — Merchant & Gould, P.C.

(57) ABSTRACT

Recreational vehicle two-stroke engine control systems configured for location-based modification of an engine calibration may include a locator device, a throttle position sensor, and an engine speed sensor communicatively coupled to an engine control unit. The engine control unit controls a position of an exhaust valve based on a first calibration map and an input from the sensors. The engine control unit also determines, based on a location of the vehicle, a second calibration map. The engine control unit controls a position of an exhaust valve based on a second calibration map and an input from the sensors. Controlling the two-stroke engine to operate the exhaust valve at the second exhaust valve position may improve the engine run-quality, performance, efficiency, or the like.

20 Claims, 4 Drawing Sheets

LOCATION-BASED MODIFICATION OF TWO-STROKE ENGINE CALIBRATION

CROSS-REFERENCE TO RELATED APPLICATIONS

This application claims the benefit of U.S. Provisional Patent Application No. 63/587,823, filed Oct. 4, 2023, entitled LOCATION-BASED MODIFICATION OF TWO-STROKE ENGINE CALIBRATION, the contents of which are expressly incorporated herein by reference.

BACKGROUND

Calibration of two-stroke engines for recreational vehicles is dependent on fuel composition. Calibrations may accommodate for engine operation effects of additives in petroleum-based fuels, such as, for example, ethanol additives or other biomass-derived additives. The proportion of fuel additives in different countries may vary based on local rules or restrictions. Therefore, two-stroke engine calibrations may be affected by country or region of operation, assuming locally-sourced fuels. For instance, in Canada and Scandinavian countries, gasoline for recreational vehicles may include a mandated amount of ethanol. Relative to countries in which gasoline for recreational vehicles includes less ethanol, the engine calibrations may be adjusted to account for effects of ethanol on combustion and lubrication, fuel-air mixture ratios, ignition timing, exhaust valve timing and the like to ensure optimal performance and longevity. Adapting two-stroke engine calibrations to regional variations in fuel compositions may improve engine efficiency, reduce engine emissions, and enhance engine durability in diverse global markets.

SUMMARY

Location-based modification of two-stroke engine calibration may be used to accommodate regional variations in fuel composition, as well as reduce the burden of manually reflashing vehicle engine control units to update engine calibrations, reducing the number of calibration data sets that must be prepared for a respective engine configuration, or both.

In some examples, the disclosure describes a recreational vehicle including a two-stroke engine with an exhaust assembly having an exhaust valve configured to adjust an orifice size defined by the exhaust valve and at least a portion of an exhaust port of the two-stroke engine. An engine control unit (ECU) of the vehicle is configured to control an operation of the engine. The ECU includes a processor and a memory device configured to store a first calibration map defining, based on at least a throttle position and an engine speed of the two-stroke engine, a first exhaust valve position. The processor is configured to receive a location signal indicative of a location of the recreational vehicle; determine, based on the location signal, a second calibration map defining, based on the throttle position and the engine speed, a second exhaust valve position different from the first exhaust valve position; and control the two-stroke engine to operate the exhaust valve at the second exhaust valve position.

In some examples, the disclosure describes a two-stroke engine control system for a recreational vehicle, including a locator device, a throttle position sensor, an engine speed sensor, and an engine control unit (ECU). The locator device is configured to generate a location signal indicative of a location of the recreational vehicle. The throttle position sensor is configured to generate a throttle signal indicative of an input from an operator-actuated throttle device. The engine speed sensor is configured to generate an engine speed signal indicative of revolutions per minute of a two-stroke engine of the recreational vehicle. The two-stroke engine may include a cylinder defining a combustion chamber and an exhaust port and an exhaust assembly including an exhaust valve configured to adjust an orifice size defined by the exhaust valve and at least a portion of the exhaust port. The ECU includes a processor and a memory device storing a first calibration map defining, based on at least the throttle signal and the engine speed signal, a first exhaust valve position. The processor is configured to receive the location signal, the throttle signal, and the engine speed signal; determine, based on the location signal, a second calibration map; determine, based on the second calibration map, the throttle signal, and the engine speed signal, a second exhaust valve position; and control the two-stroke engine to operate the exhaust valve at the second exhaust valve position.

In some examples, the disclosure describes techniques for controlling a two-stroke engine of a recreational vehicle. The technique includes receiving, by a processors of an engine control unit, a location signal indicative of a location of the recreational vehicle, a throttle signal indicative of an input from an operator-actuated throttle device, and an engine speed signal indicative of revolutions per minute of the two-stroke engine having an exhaust valve configured to adjust an orifice size defined by the exhaust valve and at least a portion of an exhaust port of the two-stroke engine. The technique also includes receiving, by the processor from a memory device, a first calibration map defining, based on at least the throttle signal and the engine speed signal, a first exhaust valve position. The technique also includes determining, by the processor based on the location signal, a second calibration map. The technique also includes determining, by the processor based on the second calibration map, the throttle signal, and the engine speed signal, a second exhaust valve position. The technique also includes controlling, by the processor, the two-stroke engine to operate the exhaust valve at the second exhaust valve position.

BRIEF DESCRIPTION OF THE DRAWINGS

The disclosure can be understood in consideration of the following detailed description of various embodiments in connection with the accompanying drawings.

DETAILED DESCRIPTION

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Location-based modification of two-stroke engine calibration control systems and the related techniques described herein may enable an engine control unit (also referred to as an electronic control unit or ECU) to adjust an engine calibration map based on location data and to modify operational parameters of the two-stroke engine. In other words, the location of the vehicle is used to alter or otherwise modify an engine calibration map to better suit the local region of operation. Modification of engine operation in this manner may improve consistency of engine run quality and performance across a wider range of geographic areas compared to other techniques of adjusting regional engine calibrations.

Location data includes data that is indicative of a geographic location of the vehicle, including, but not limited to, geographic coordinates or global positioning system (GPS) coordinates specifying longitude and latitude, other geodetic coordinates, or region-specific data indicative of country, province, state, county, city, or the like. Location data may be general, such as indicative of a continent or a country; more refined, such as indicative of a province or a state; or more precise, such as indicative of a county, a city, or an exact GPS location.

The calibration modification may be based on selection of a predetermined calibration map; application of one or more scaling coefficients or offsets to one or more predetermined calibration data sets; dynamic calculation of a calibration data set that may be optionally based on one or more predetermined calibration data sets; or combinations thereof. In addition to location data, other operational parameters indicative of the environment in which the vehicle is operating or indicative of how the vehicle is operating may be used to determine, at least in part, the calibration modification. For example, other operational parameters that may be detected using sensors or other data include, but are not limited to, engine speed, throttle position, exhaust valve position, air temperature, air pressure, boost air temperature, boost pressure, fuel temperature, fuel pressure, knock signal, water temperature, exhaust bypass position, exhaust temperature, or silencer temperature. As such, the ECU can determine or receive one or more calibrations for a select geographic area to improve engine run quality by modifying engine calibration to better match available fuel in a select location, atmospheric conditions present in the select location, and engine performance.

The two-stroke engine control systems and related techniques for calibration adjustment described herein may be used to accommodate regional variations in fuel composition, as well as reduce the burden of manually reflashing vehicle engine control units to alter engine calibration, reducing the number of calibration data sets that must be prepared for a respective engine configuration, or both.

Figure 1:
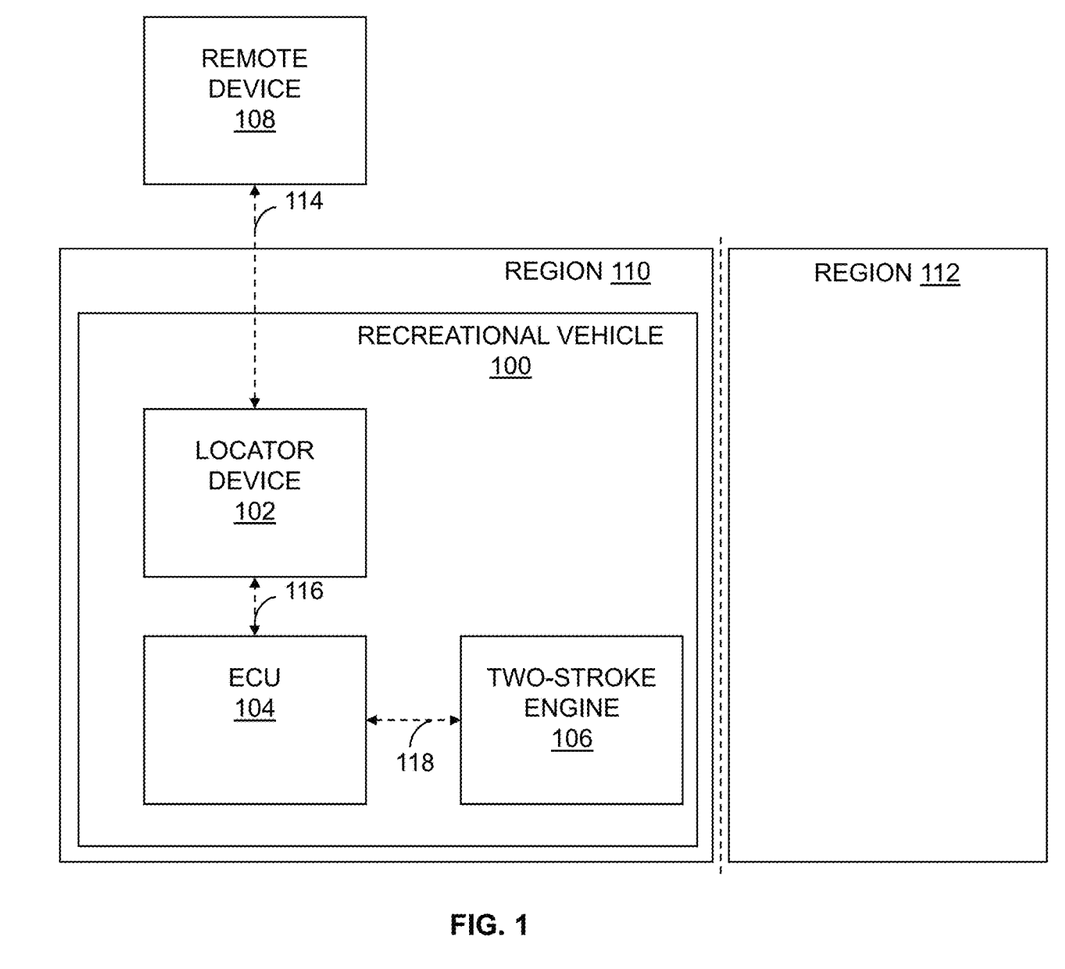
FIG. 1 is a conceptual block diagram illustrating an example recreational vehicle configured for location-based modification of an engine calibration.

FIG. 1 is a conceptual block diagram illustrating an example recreational vehicle 100 (hereinafter, vehicle 100) configured for location-based modification of an engine calibration. Vehicle 100 includes a location determination device 102 (hereinafter, locator 102) operatively coupled to an engine control unit 104 (also referred to as an electronic control unit) (hereinafter, ECU 104) that is operatively coupled to a two-stroke engine 106 (hereinafter, engine 106). ECU 104 of vehicle 100 is configured to use geographic location data from locator 102 to control operation of engine 106, such as via selection of a calibration map or modifications to a calibration map used to operate engine 106. In this way, the systems described herein may be used to improve operation of engine 106 based on the location of vehicle 100. This provides the advantage of accounting for location-based influences on engine operation, such as, for example, the types of fuels available for vehicle 100 in a select location.

Vehicle 100 includes any suitable vehicle having a two-stroke engine. Example vehicles include, but are not limited to, recreational vehicles, snowmobiles, motorcycles, autocycle, roadsters, all-terrain vehicles, utility terrain vehicles, side-by-sides, personal watercraft, and boats.

Locator 102 is configured to determine a location of vehicle 100. For example, locator 102 may determine that vehicle 100 is located in region 110. Additionally, or alternatively, locator 102 may determine that vehicle 100 is not located in a second, different location, such as region 112.

In some examples, locator 102 may receive from a remote device 108 a location signal 116 that is indicative of a location of vehicle 100. For example, remove device 108 may include one or more suitable systems or devices configured to output a communications signal 114 (i.e., location signal 116 or data from which location signal 116 may be derived), including, but not limited to, a satellite, a radio tower, a cellular tower, a Wi-Fi gateway or wireless router, radio frequency identification (RFID) tag, a cellular phone, a Bluetooth enabled device, and a nearfield communication enabled device. Communications signal 114 may include one or more of a GPS signal, a radio signal, a cellular signal, a Wi-Fi signal, a RFID signal, a Bluetooth signal, a nearfield communication signal, or other signal suitable to transmit location data. Locator 102 may include one or more computing device or modules configured to receive communications signal 114, such as, for example, a global positioning system (GPS) module, a cellular receiver, a Wi-Fi receiver, a Bluetooth receiver, a radio receiver, a nearfield communication receiver, or the like. In this way, locator 102 may be configured to determine the location of vehicle 100 based at least in part on GPS, cellular network triangulation, Wi-Fi positioning, sensing one or more radio frequencies, or sensing nearfield communication frequencies.

Additionally, or alternatively, locator 102 may be configured to determine, based on one or more detected velocity changes of vehicle 100 and/or one or more detected directional changes of vehicle 100, location signal 116. For example, locator 102 may be communicatively coupled to a motion sensor suite that includes one or more accelerometers, gyroscopes, and/or inertial sensors. The motion sensor suite may be disposed within locator 102 or associated with other systems of vehicle 100, such as, for example, an in-vehicle infotainment system or suspension system of vehicle 100. The motion sensor suite is configured to determine, based on a predetermined start location and a compilation of tracked velocity changes and/or directional changes an end location of vehicle 100. In this way, locator 102 may be configured to determine the location of vehicle 100 based at least in part on inertial navigation and/or dead reckoning.

In some examples, locator 102 may include or be communicatively coupled to a telematic control unit (TCU) or other connected device communicatively coupled to the Internet, or a remote device communicatively coupled to the Internet. When linked to an Internet-enabled device in this manner, locator 102 may be configured to receive over-the-air updates that include data indicative of the location of vehicle 100 or that otherwise modify location signal 116 output by locator 102.

Locator 102, after optionally processing communications signal 114 or otherwise determining the location of vehicle 100 as described above, may output location signal 116 for receipt by ECU 104. Locator 102 and ECU 104 are operatively coupled by a suitable wired or wireless communications link. For example, the communication link may include a discrete output link or a network protocol such as a controller area network (CAN), local interconnect network (LIN), or other suitable protocol suitable for use in vehicle 100.

ECU 104 is configured to control at least one operational parameter of engine 106. For example, ECU 104 is configured to determine, based on location signal 116, a calibration map and control, based on the calibration map, at least one operational parameter of engine 106. In some examples, ECU 104 is configured to store a plurality of calibration maps, such as at least a first calibration map and a second calibration map, at least three calibration maps, at least four calibration maps, at least five calibration maps, or more calibration maps. In other examples, ECU 104 may be configurable to reflash stored calibration maps, such as via wired or wireless reflash from a remote device (not illustrated).

ECU 104 may determine the calibration map by selecting a calibration map from a plurality of predetermined calibration maps based on location signal 116, extrapolating one or more calibration values from a predetermined calibration map based on location signal 116, interpolating one or more calibration values from a first calibration map and a second calibration map based on location signal 116, or otherwise applying one or more calibration offsets to a calibration map based on location signal 116.

ECU 104 may use the determined calibration map to output a control signal 118 to engine 106. ECU 104 and engine 106 are operatively coupled by a suitable wired or wireless communications link, such as a discrete output link or a network protocol as described above. In this way, vehicle 100 is configured to modify or otherwise change the engine calibration either through a complete calibration change or a singular or plurality of calibration offsets to better suit the calibration needs of a specific geographic region based on fuel quality, altitude, humidity, temperature, or any other prevalent region-specific factors that impact the engine calibration.

In some examples, control signal 118 may be configured to control a position of an exhaust valve of engine 106. For example, the one or more calibration maps stored on ECU 104 define at least an exhaust valve position of an exhaust valve of engine 106 based on a at least a throttle position of engine 106 and an engine speed of engine 106. As one example, ECU 104 is configured to determine, based on a first calibration, a first throttle position, and a first engine speed, a first exhaust valve position; and is configured to determine, based on a second calibration, the first throttle position, and the first engine speed, a second, different exhaust valve position.

Figure 2A:
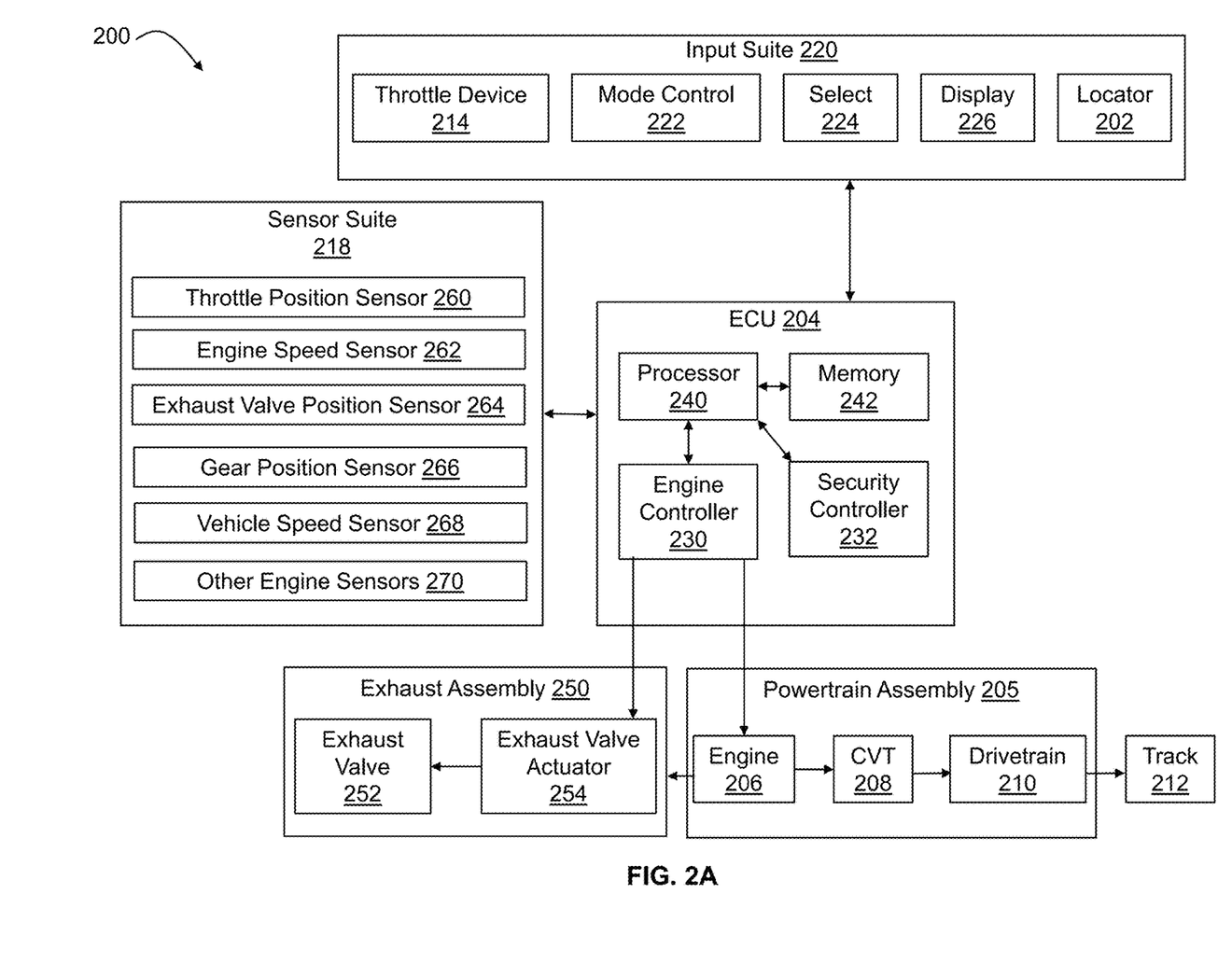
FIGS. 2A and 2B are conceptual block diagrams illustrating an example snowmobile configured for location-based modification of an engine calibration.
Figure 2B:
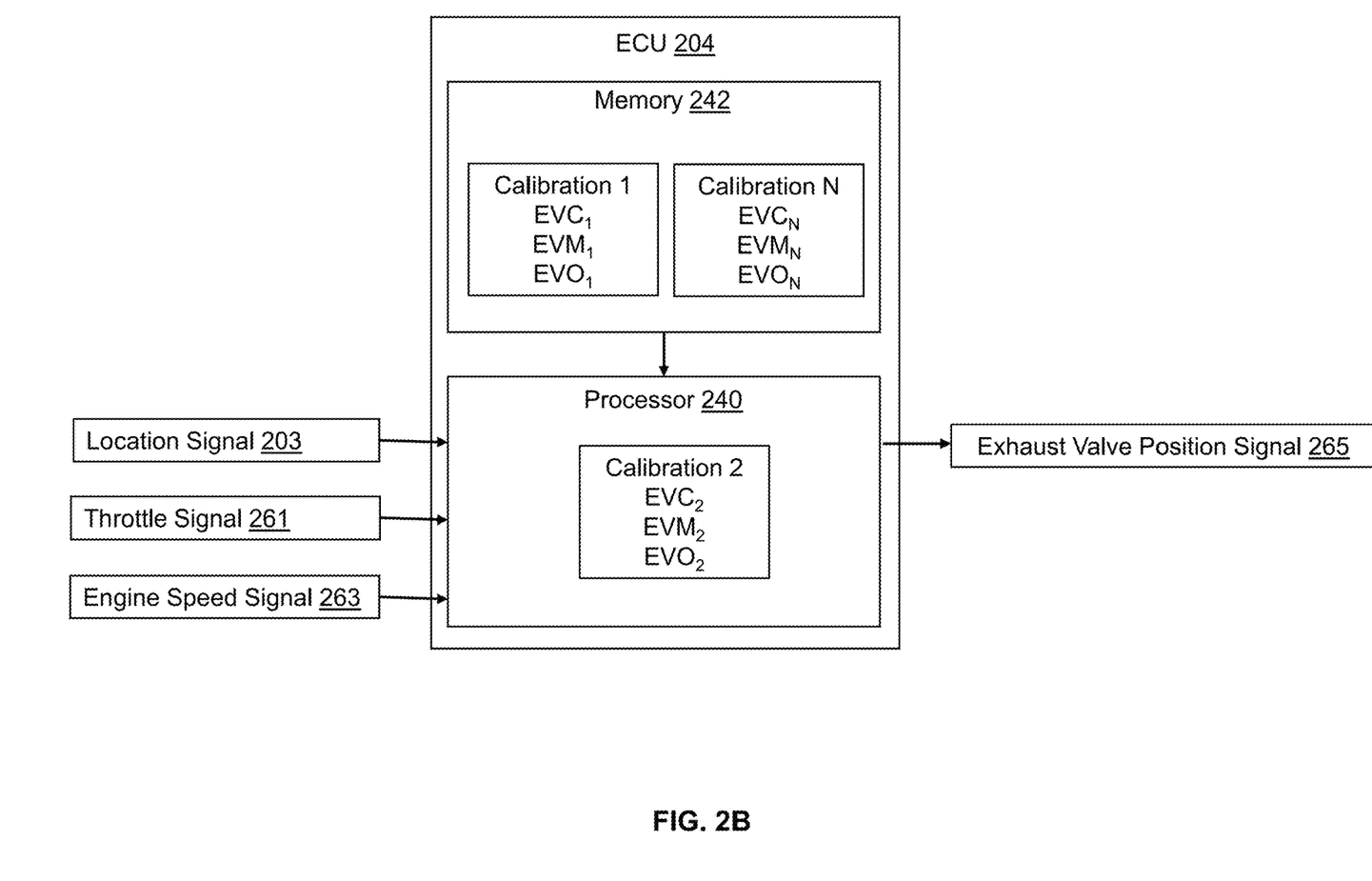

FIGS. 2A and 2B are conceptual block diagrams illustrating an example snowmobile 200 configured for location-based modification of an engine calibration. Snowmobile 200 may be the same as, or substantially similar to, vehicle 100 described above in reference to FIG. 1, except for the differences described herein. For example, as described in reference to FIG. 2, the vehicle includes snowmobile 200, although, in other examples, snowmobile 200 may include other types of recreational vehicles having a two-stroke engine.

Snowmobile 200 includes a chassis supported by skis and an endless track 212, each coupled to a respective front and rear suspension. Snowmobile 200 includes straddle seat configured to support at least a driver and, optionally, a passenger rearward of the driver. The chassis supports a powertrain assembly 205 including a two-stroke, internal-combustion engine 206 (hereinafter, engine 206) configured to drive endless track 212 and a steering assembly configured to control a position of the skis. Snowmobile 200, engine 206, and/or systems associated therewith may include those snowmobiles, engines, and/or systems as described in U.S. Pat. No. 8,590,654, entitled "Snowmobile," issued Nov. 26, 2013; U.S. Pat. No. 8,733,773, entitled "Snowmobile Having Improved Clearance for Deep Snow," issued May 27, 2014; U.S. Patent Pub. No. 2014/0332293A1, entitled "Snowmobile," published Jul. 23, 2014; U.S. Pat. No. 11,110,994, entitled "Snowmobile," issued Sep. 7, 2021; and U.S. Provisional Patent Application No. 63/583,312, entitled "Electronic Throttle Control of Snowmobile with Two-Stroke Internal-Combustion Engine, filed on Sep. 18, 2023, all of which are assigned to Polaris Industries Inc. and incorporated herein by reference in their entireties.

Powertrain assembly 205 includes engine 206 and a transmission including, for example, a continuous variable transmission 208 (hereinafter, CVT 208), and one or more drivetrain components 210, which mechanically couple engine 206 to endless track 212. Engine 206 having a two-stroke engine cycle, as will be understood by those of ordinary skill in the art, includes various systems and components, such as an engine block with one or more combustion chambers defining one or more respective intake ports and one or more respective exhaust ports, one or more pistons, a fuel system that may optionally include an electronic fuel-injection (EFI) system, one or more intake valves, an exhaust system, one or more exhaust valves, an electrical system, a cooling system, and various sensors, such as a throttle position sensor, engine speed sensor, crank position sensor, and so on.

Exhaust assembly 250 is fluid coupled to engine 206 and configured to direct exhaust gases from engine 206. Exhaust assembly 250 includes an expansion chamber or a tuned pipe fluidly coupled to the one or more exhaust ports of engine 206. As known in the art, a shape of the tuned pipe may be selected to promote removal of exhaust from the combustion chamber and mitigate air-fuel mixture from leaving the combustion chamber before deflagration of the air-fuel mixture.

Exhaust assembly 250 also includes an exhaust valve 252 (also referred to as a power valve) and an exhaust valve actuator 254. Exhaust valve 252 is configured to define an orifice size defined by at least a portion of exhaust valve 252 and at least a portion of the exhaust port of engine 206. Exhaust valve actuator 254 is configured to mechanically actuate exhaust valve 252 to adjust the orifice size. By adjusting the orifice size, for example, based on one or more of a position of a throttle of snowmobile 200, an engine speed of engine 206, or other detected operational parameters of snowmobile 200, snowmobile 200 may be configured to enhance engine performance over a wider range of engine speeds compared to a two-stroke engine without exhaust valve 252.

In some examples, exhaust valve 252 may include a gate valve, such as a guillotine valve or a knife valve. To actuate exhaust valve 252, exhaust valve actuator 254 may include an electro-mechanical device, such as a electromechanical motor, that is configured to convert rotational motion into linear motion to actuate an armature coupled to a stem of exhaust valve 252. In this way, an electrical signal may be used to cause exhaust valve actuator 254 to open and/or close exhaust valve 252. Exhaust valve actuator 254 may include suitable actuation means, such as, for example, a solenoid, an electric motor, a centrifugal clutch, a mechanical linkage, a pneumatic actuator, a hydraulic actuator, or the like.

During operation of engine 206, at lower engine speeds, exhaust valve 252 may be at or near a closed position. When exhaust valve 252 is in the closed position, the size of the orifice defined by the exhaust port and exhaust valve 252 is at a minimum. Even in the closed position, exhaust valve 252 may not fully block the exhaust port. At higher engine speeds, exhaust valve 252 may be at or near an open position. When exhaust valve 252 is in the open position, the size of the orifice defined by the exhaust port and exhaust valve 252 is at a maximum.

In some examples, when engine 206 is operating at an engine speed between the higher engine speed and the lower engine speed, exhaust valve 252 may be configured to define one or more mid-positions between the open position and the closed position. When exhaust valve 252 is in a mid-position, the orifice size is between the maximum orifice size and the minimum orifice size. By adjusting the orifice size defined by the exhaust valve 252 and the exhaust port, the efficiency and/or performance of engine 206 may be increased compared to a two-stroke engine without an exhaust valve.

An operation of engine 206 may be controlled by electronic control unit 204 (also referred to as, engine control unit 204) (hereinafter, ECU 204). ECU 204 may be the same as or substantially similar to ECU 104 described above in reference to FIG. 1, except for the differences described herein. ECU 204 includes processor circuitry (processor 240), a memory 242, an engine controller 230, and security controller 232.

ECU 204 functions as a vehicle controller and though depicted as a single ECU, may in some embodiments include one or more ECUs having one or more processors (e.g., processor 240) and one or more memory storage devices (e.g., memory 242) for controlling electrical systems or subsystems of snowmobile 200. Additional controllers or ECUs not depicted may also be present, such as those specific to control operating systems, including engine 206 and security-related devices, and/or other connected devices. Functions of ECU 204 may be performed by hardware and/or computer instructions saved on memory devices, such as non-transient, computer-readable storage mediums.

Memory 242 is configured to store various types of vehicle data and executable computer-program instructions. Memory 242 includes computer-readable media in the form of volatile and/or nonvolatile memory and may be removable and/or non-removable. For example, memory 242 may include random access memory (RAM), read only memory (ROM), electronically erasable programmable read only memory (EE-PROM), flash memory, optical or magnetic storage devices, and/or other medium that can be used to store information and can be accessed by electronic devices.

ECU 204 also includes an engine controller 230. Engine controller 230 may be configured to control one or more operational parameters of engine 206. Operational parameters of engine 206 may include, but are not limited to, a position of exhaust valve or other engine exhaust controls, intake valve position or other air intake controls, air-fuel mixture, ignition timing, engine cooling, transmission engagement or gear selection, idle speed, throttle response, or the like. In examples in which the operational parameters include a position of exhaust valve 252, engine controller 230 is configured to control various operations of engine 206, including exhaust valve actuator 254.

In some examples, ECU may include security controller 232. Security controller 232 may be configured to control an operation of a component of snowmobile 200, an ability to modify a component of snowmobile 200, or both. For example, security controller 232 may prevent modification (e.g., reflash) of one or more calibration maps stored on memory 242 of ECU 204.

Snowmobile 200 also includes sensor suite 218 and input suite 220. Each of sensor suite 218 and input suite 220 are representative of a plurality of components that may be located within common devices or dispersed among one or more separate devices. Sensor suite 218 and input suite 220 are operatively coupled to ECU 204. For example, snowmobile 200 may also include a vehicle network bus (e.g., a CAN bus, a LIN bus, or both) connecting the various controllers and electrical devices of snowmobile 200, such as one or more sensors of sensor suite 218 and/or one or more input devices of input suite 220 to ECU 204.

Sensor suite 218 includes a plurality of sensors including, but not limited to, throttle position sensor 260, engine speed sensor 262, exhaust valve position sensor 264, gear position sensor 266, vehicle speed sensor 268 (e.g., groundspeed sensor), and other engine sensors 270.

The sensors of sensor suite 218 are in electrical communication with ECU 204. Throttle position sensor 260 detects and indicates a position of user-actuated throttle device 214. The position of throttle device 214 generally indicates a throttle input that is requested by the operator. In some examples, throttle position sensor 260 is located at or near throttle device 214, which may be a throttle lever, throttle pedal, throttle grip, or other throttle input device. Throttle position sensor 260 detects the requested throttle position and communicates that to ECU 204. Engine speed sensor 262 detects and indicates an engine speed, which may be measured in revolutions per minute (RPM). Exhaust valve position sensor 264 detects and indicates an actual position of exhaust valve 252. In an embodiment, exhaust valve position sensor 264 may be located at or near exhaust valve actuator 254. Other engine sensors 270 may also be present and in communication with ECU 204. Gear position sensor 266 detects and indicates a gear position of snowmobile 200, such as for example neutral, reverse, low gear, or high gear. Vehicle speed sensor 268 detects and indicates a groundspeed of snowmobile 200. Other engine sensors 270 may include one or more fault sensors, engine temperature sensor, exhaust temperature sensor, an ambient air temperature sensor, barometric pressure sensor, fuel pressure sensor, low-fuel sensor, ECU voltage sensor, brake sensor, e.g., to detect whether brakes are engaged, and other such sensors.

Input suite 220 includes a plurality of operator input devices and/or user interfaces including, but not limited to, a mode control device 222, a select input device 224, a display 226, and a location determination device 202 (hereinafter, locator 202). Locator 202 may be the same as, or substantially similar to, locator 102 described above in reference to FIG. 1, except for the differences described herein. For example, locator 202 may be configured to receive from a remote device (e.g., remote device 108) a communications signal (e.g., communications signal 114)

indicative of a location of snowmobile 200, determine based on detected velocity and/or directional changes a location of snowmobile 200, or a combination of both.

ECU 204 is in electrical communication with input suite 220 and configured to receive, e.g., by processor 240, input from the operator of snowmobile 200 and, in some examples, display on display 226 or otherwise communication information to the operator.

Mode control 222 includes one or more discrete buttons (e.g., electrical or mechanical buttons and/or switches) or one or more graphical user interface (GUI) buttons displayed on a touchscreen of display 226 that are configured to enable an operator to select an operating mode of snowmobile 200. Operating modes may include, for example, economy (ECO), standard, sport, performance, utility, work, or other suitable modes.

Each mode may be associated with a selected engine calibration map or otherwise cause ECU 204 to control engine 206 in a predetermined manner. For example, a throttle input when in ECO mode may cause a different engine response compared to the same throttle input when in sport mode. In some examples, mode selection may affect other vehicles systems, such as, for example, a suspension of the vehicle or the like.

Select input device 224 includes one or more discrete buttons (e.g., electrical or mechanical buttons and/or switches), one or more graphical user interface (GUI) buttons displayed on a touchscreen of display 226, or both that are configured to enable an operator to select operational settings or options.

In some examples, input suite 220 may include additional or alternative input devices associated with a gauge of snowmobile 200. For example, an operator may interface with the gauge to select a type of fuel being used in snowmobile 200, a maximum speed limit of snowmobile 200, security information to limit operation of snowmobile 200, or other information configured to alter or otherwise control a function or operation of at least a portion of snowmobile 200.

Input suite 220 may collectively include a human-machine interface and may include display 226. Display 226 may be configured to display various information to an operator of snowmobile 200, such as ground speed, engine speed, engine temperature, outside temperature, and so on. In an embodiment, display 226 may include a touchscreen display configured to receive input from the operator, as well as being configured to display information to the operator.

During operation, a speed of engine 206 is controlled, at least in part, based on an input from an operator controlling throttle device 214. For example, a position of the throttle device 214 may be detected by a throttle position sensor 260. Throttle position sensor 260 may generate a throttle signal 261 indicative of the position of throttle device 214 that is received by ECU 204, e.g., processor 240. Processor 240 may output to engine 206 a throttle command, thereby controlling a speed of engine 206.

Exhaust valve actuator 254 is controlled, at least in part, based on an input from one or more of locator 202, engine speed sensor 262, and throttle position sensor 260. For example, ECU 204 may receive from locator 202 a location signal 203 indicative of a geographic location for snowmobile 200, and a throttle signal 261, as described above. Additionally, engine speed sensor 262 may generate an engine speed signal 263 indicative of the speed of engine 206 that is received by ECU 204, e.g., processor 240. Processor 240 may determine a calibration map, based on at least one of throttle signal 261, engine speed signal 263, and location signal 203. Processor 240 also may determine, based on the determined calibration map, exhaust valve position signal 265. Processor 240 may output to exhaust valve actuator 254 the exhaust valve position signal 265, thereby controlling position of exhaust valve 252.

Determining the calibration map may include selecting a predetermined calibration map or calculating a second calibration map using a first predetermined calibration map. For example, processor 240 may be configured to determine, based on location signal 203 a region code. The region code may be associated with a predetermined calibration map. For example, processor 240 may be configured to select, based on a region code associated with each predetermined calibration in a look-up table or the like, Calibration 1 or another calibration, such as Calibration N, associated with the region code. In this way, processor 240 may select a predetermined calibration map associated with the region code.

When calculating a second calibration map using a first predetermined calibration map, processor 240 may be configured to determine, based on location signal 203, a calibration offset. Processor 240 may retrieve from memory 242 the first calibration curve Calibration 1 including predetermined values indicative of an exhaust valve position at a closed position ($EVC_1$), a mid-position ($EVM_1$), an open position ($EVO_1$). The calibration offset may include one or more scaling coefficients. Each scaling coefficient may be indicative of a scaling factor for a predetermined exhaust valve position. For example, the calibration offset may include a grouping [x, y, z], where x corresponds to a scaling coefficient for a closed position of exhaust valve 252, y corresponds to a scaling coefficient for a mid-position of exhaust valve 252, and z corresponds to a scaling coefficient for an open position of exhaust valve 252. Each of x, y, and z may include a scaling factor between zero and one or, alternatively, a percentage between 0 and 100. In some examples, the scaling factor may include negative values. In some examples, second calibration map Calibration 2, including predetermined values indicative of an exhaust valve position at a closed position ($EVC_2$), a mid-position ($EVM_2$), an open position ($EVO_2$), may be determined based on the following equations:

$$EVC_2 = x(EVC_1)$$
$$EVM_2 = y(EVM_1)$$
$$EVO_2 = z(EVO_1)$$

In other examples, processor 240 may use two or more predetermined calibration maps to extrapolate, interpolate, or otherwise derive the determined calibration map. For example, Calibration 1 and Calibration N may include predetermined bounding calibrations based on selected operational parameters, such as amounts of fuel additive, altitude, or other operational parameters. As such, processor 240 is configured to blend Calibration 1 and Calibration N to determined Calibration 2. For example, processor 240 may retrieve from memory 242 a third Calibration N including predetermined values indicative of an exhaust valve position at a closed position ($EVC_N$), a mid-position ($EVM_N$), an open position ($EVO_N$). Processor 240 may determine second calibration map Calibration 2 based on the following equations:

$$EVC_2 = EVC_1 + x(EVC_N - EVC_1)$$
$$EVM_2 = EVM_1 + y(EVM_N - EVM_1)$$
$$EVO_2 = EVO_1 + z(EVO_N - EVO_1)$$

In other examples, the calibration offset may include a plurality of scaling coefficient values for the one or more scaling coefficients. For example, the calibration offset may include an offset map defining at least one scaling coefficient having a minimum value, a maximum valve and, optionally, at least one value therebetween. In some examples, location signal 203 may include data indicative of a biasing between the minimum valve and maximum valve or a plurality of the at least one scaling coefficients. Using a plurality of scaling coefficient values may provide greater resolution or otherwise further refine the determined second calibration map compared to using only single scaling coefficients.

Figure 3:
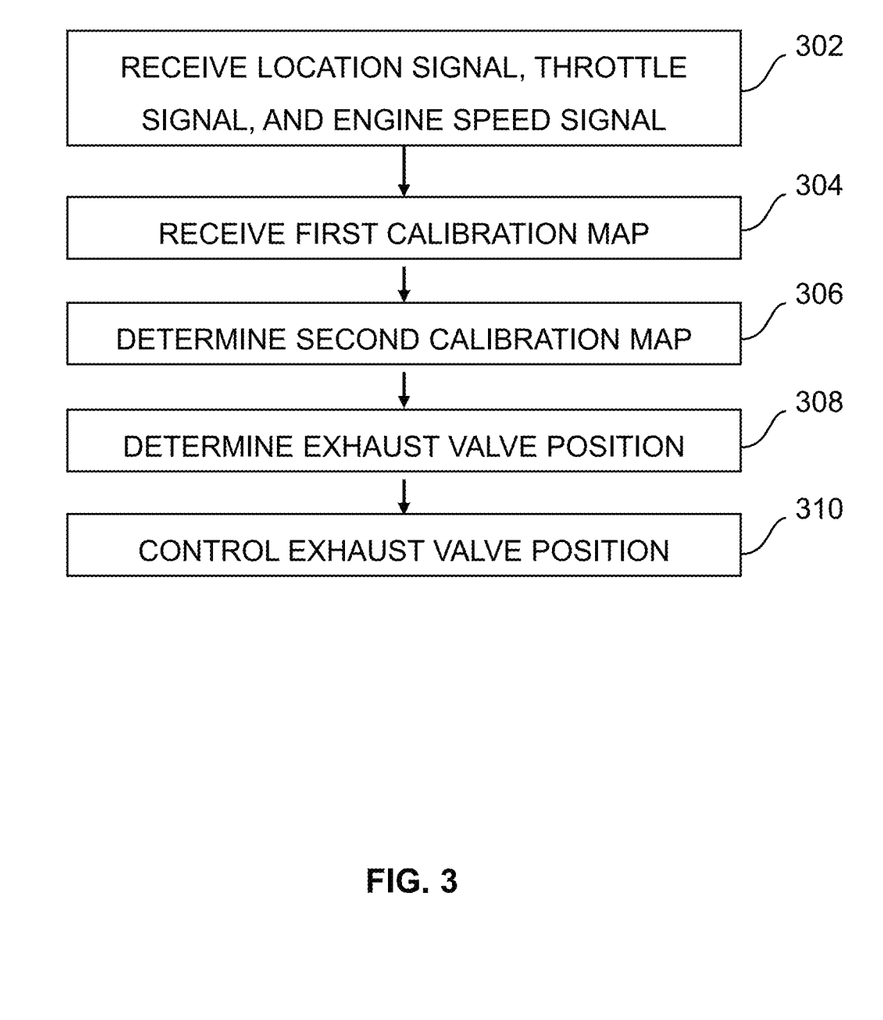
FIG. 3 is a flow diagram illustrating an example technique for location-based modification of a two-stroke engine calibration.

FIG. 3 is a flow diagram illustrating an example technique for location-based modification of a two-stroke engine. The technique illustrated in FIG. 3 will be described with reference to the snowmobile 200 illustrated in FIGS. 2A and 2B for ease of description, although the technique may be used to with other recreational vehicles having a two-stroke engine, such as vehicle 100. Additionally, other techniques may be used to control other vehicles and/or other two-stroke engines.

The technique illustrated in FIG. 3 includes receiving, by processor 240 of ECU 204, location signal 203, throttle signal 261, and engine speed signal 263. Location signal 203 may be determined or otherwise generated by locator 202 and is indicative of a location of snowmobile 200 (e.g., recreational vehicle 100 located in region 110. Throttle signal 261 may be output or otherwise generated by throttle position sensor 260 and is indicative of an input from an operator-actuated throttle device 214. Engine speed signal 263 may be output or otherwise generated by engine speed sensor 262 and is indicative of revolutions per minute of engine 206. Engine 206, as described above, includes or is otherwise coupled to exhaust assembly 250 including exhaust valve 252 configured to adjust an orifice size defined by exhaust valve 252 and at least a portion of an exhaust port of engine 206.

The technique illustrated in FIG. 3 also includes receiving, by processor 240 from memory 242, a first calibration map (e.g., Calibration 1) defining, based on at least throttle signal 261 and engine speed signal 263, a first exhaust valve position.

The technique illustrated in FIG. 3 also includes determining, by processor 240 based on location signal 203, a second calibration map (e.g., Calibration 2). For example, as described above, determining the second calibration map may include selecting, based on location signal 203, one or more predetermined calibration maps or calculating, based on location signal 203 and one or more predetermined calibration maps, one or more calculated calibration maps.

In some examples, the technique may include determining, by processor 240, based on location signal 203, a region code and determining, by processor 240, based on the region code, the second calibration map.

The technique illustrated in FIG. 3 also includes determining, by processor 240 based on the determined second calibration map, throttle signal 261, and engine speed signal 263, a second exhaust valve position. For example, the technique may include determining, by processor 240, based on location signal 203, a calibration offset. The calibration offset may include one or more scaling coefficients as described above. Additionally, the technique may include determining, by processor 240, based on the first calibration map and the calibration offset, the second calibration map.

Additionally, or alternatively, memory 242 may be configured to store a third calibration map, and the technique may include determining, by processor 240, based on location signal 203, a calibration offset. The calibration offset may include one or more scaling coefficients as described above. Additionally, the technique may include determining, by processor 240, based on the first calibration map, the third calibration map, and the calibration offset, the second calibration map. For example, the second calibration map may be interpolated, extrapolated, or otherwise derived from the first calibration map and the third calibration map.

The technique illustrated in FIG. 3 also includes controlling, by processor 240, engine 206 (e.g., exhaust valve actuator 254) to operate exhaust valve 252 at the second exhaust valve position. For example, the technique may include generating, by processor 240, a second exhaust valve position signal 265 indicative of the second exhaust valve position. Additionally, the technique may include receiving, by exhaust valve actuator 254 communicatively coupled to processor 240, the second exhaust valve position signal 265 and causing, by exhaust valve actuator 254, exhaust valve 252 to move to or toward the second exhaust valve position.

The following clauses illustrated example subject matter described herein.

Clause 1. A recreational vehicle, comprising: a two-stroke engine comprising an exhaust assembly having an exhaust valve configured to adjust an orifice size defined by the exhaust valve and at least a portion of an exhaust port of the two-stroke engine; and an engine control unit including a processor and a memory device configured to store a first calibration map defining, based on at least a throttle position and an engine speed of the two-stroke engine, a first exhaust valve position, wherein the processor is configured to: receive a location signal indicative of a location of the recreational vehicle, determine, based on the location signal, a second calibration map defining, based on the throttle position and the engine speed, a second exhaust valve position different from the first exhaust valve position, and control the two-stroke engine to operate the exhaust valve at the second exhaust valve position.

Clause 2. The recreational vehicle of clause 1, further comprising: an engine speed sensor configured to generate an engine speed signal indicative of revolutions per minute of the two-stroke engine, wherein the processor is configured to receive the engine speed signal; and a throttle position sensor configured to generate a throttle signal indicative of an input from an operator-actuated throttle device, wherein the processor is configured to receive the throttle signal, wherein the processor is configured to determine, based on the second calibration map, the throttle signal, and the engine speed signal, the second exhaust valve position.

Clause 3. The recreational vehicle of clause 1 or 2, further comprising an electronic actuator communicatively coupled to the processor and mechanically coupled to the exhaust valve, wherein the processor is configured to generate an exhaust valve position signal indicative of the second exhaust valve position, and wherein the electronic actuator is configured to receive from the processor the exhaust valve position signal and cause the exhaust valve to move to the second exhaust valve position to control the two-stroke engine to operate the exhaust valve at the second exhaust valve position.

Clause 4. The recreational vehicle of any one of clauses 1 through 3, wherein the processor is configured to: determine, based on the location signal, a calibration offset; and determine, based on the first calibration map and the calibration offset, the second calibration map.

Clause 5. The recreational vehicle of any one of clauses 1 through 4, wherein the memory is further configured to store a third calibration map, and wherein the processor is configured to: determine, based on the location signal, a calibration offset; and determine, based on the first calibration map, the third calibration map and the calibration offset, the second calibration map.

Clause 6. The recreational vehicle of any one of clauses 1 through 5, wherein the processor is configured to: determine, based on the location signal, a region code; and determine, based on the region code, the second calibration map.

Clause 7. The recreational vehicle of any one of clauses 1 through 6, wherein the first calibration map and the second calibration map define respective first and second exhaust valve positions comprising: an exhaust valve open position; an exhaust valve closed position; and an exhaust valve mid-position, wherein the mid-position is between the open position and the closed position.

Clause 8. The recreational vehicle of clause 7, wherein the orifice size is at a maximum when the exhaust valve is in the open position, wherein the orifice size is at a minimum when the exhaust valve is in the closed position, and wherein the orifice size is between the maximum orifice size and the minimum orifice size when the exhaust valve is in the mid-position.

Clause 9. The recreational vehicle of any one of clauses 1 through 8, further comprising a locator device configured to determine, based on one or more communications signals received from one or more remote devices, the location signal, wherein the processor is configured to receive from the locator device the location signal.

Clause 10. The recreational vehicle of any one of clauses 1 through 9, further comprising a locator device configured to determine, based on one or more detected velocity changes and one or more detected directional changes, the location signal, wherein the processor is configured to receive from the locator device the location signal.

Clause 11. A two-stroke engine control system for a recreational vehicle, comprising: a locator device configured to generate location signal indicative of a location of the recreational vehicle; a throttle position sensor configured to generate a throttle signal indicative of an input from an operator-actuated throttle device, an engine speed sensor configured to generate an engine speed signal indicative of revolutions per minute of a two-stroke engine including a cylinder defining a combustion chamber and an exhaust port and an exhaust assembly including an exhaust valve configured to adjust an orifice size defined by the exhaust valve and at least a portion of the exhaust port, an engine control unit including a processor and a memory device storing a first calibration map defining, based on at least the throttle signal and the engine speed signal, a first exhaust valve position, wherein the processor is configured to: receive the location signal, the throttle signal, and the engine speed signal; determine, based on the location signal, a second calibration map; determine, based on the second calibration map, the throttle signal, and the engine speed signal, a second exhaust valve position; and control the two-stroke engine to operate the exhaust valve at the second exhaust valve position.

Clause 12. The two-stroke engine control system of clause 11, further comprising an electronic actuator communicatively coupled to the processor, wherein the processor is configured to generate a second exhaust valve position signal indicative of the second exhaust valve position, and wherein the electronic actuator is configured to receive from the processor the exhaust valve position signal and cause the exhaust valve to move to the second exhaust valve position to control the two-stroke engine to operate the exhaust valve at the second exhaust valve position.

Clause 13. The two-stroke engine control system of clause 11 or 12, wherein the processor is configured to: determine, based on the location signal, a calibration offset; and determine, based on the first calibration map and the calibration offset, the second calibration map.

Clause 14. The two-stroke engine control system of any one of clauses 11 through 13, wherein the memory is further configured to store a third calibration map, and wherein the processor is configured to: determine, based on the location signal, a calibration offset; and determine, based on the first calibration map, the third calibration map and the calibration offset, the second calibration map.

Clause 15. The two-stroke engine control system of any one of clauses 11 through 14, wherein the processor is configured to: determine, based on the location signal, a region code; and determine, based on the region code, the second calibration map.

Clause 16. The two-stroke engine control system of any one of clauses 11 through 15, wherein the first calibration map and the second calibration map define respective first and second sets of exhaust valve positions, each set of exhaust valve positions comprising: an exhaust valve open position; an exhaust valve closed position; and an exhaust valve mid-position, wherein the mid-position is between the open position and the closed position.

Clause 17. The two-stroke engine control system of clause 16, wherein the orifice size is at a maximum when the exhaust valve is in the open position, wherein the orifice size is at a minimum when the exhaust valve is in the closed position, and wherein the orifice size is between the maximum orifice size and the minimum orifice size when the exhaust valve is in the mid-position.

Clause 18. The two-stroke engine control system of any one of clauses 11 through 17, further comprising a locator device configured to determine, based on one or more communications signals received from one or more remote devices, the location signal, wherein the ECU is configured to receive from the locator device the location signal.

Clause 19. The two-stroke engine control system of any one of clauses 11 through 18, further comprising a locator device configured to determine, based on one or more detected velocity changes and one or more detected directional changes, the location signal, wherein the ECU is configured to receive from the locator device the location signal.

Clause 20. A method of controlling a two-stroke engine of a recreational vehicle, comprising: receiving, by a processors of an engine control unit, a location signal indicative of a location of the recreational vehicle, a throttle signal indicative of an input from an operator-actuated throttle device, and an engine speed signal indicative of revolutions per minute of the two-stroke engine having an exhaust valve configured to adjust an orifice size defined by the exhaust valve and at least a portion of an exhaust port of the two-stroke engine; receiving, by the processor from a memory device, a first calibration map defining, based on at least the throttle signal and the engine speed signal, a first exhaust valve position; determining, by the processor based on the location signal, a second calibration map; determining, by the processor based on the second calibration map, the throttle signal, and the engine speed signal, a second exhaust valve position; and controlling, by the processor, the two-stroke engine to operate the exhaust valve at the second exhaust valve position.

Clause 21. The method of clause 20, wherein the method further comprises: generating, by a locator device, the location signal indicative of a location of the recreational vehicle; generating, by a throttle position sensor operatively coupled to the input from the operator-actuated throttle device, the throttle signal; and generating, by an engine speed sensor operatively coupled to the two-stroke engine, the engine speed signal.

Clause 22. The method of clause 20 or 21, wherein the method further comprises: generating, by the processor, a second exhaust valve position signal indicative of the second exhaust valve position; receiving, by an electronic actuator communicatively coupled to the processor, the second exhaust valve signal; and causing, by the electronic actuator, the exhaust valve to move to the second exhaust valve position.

Clause 23. The method of any one of clauses 20 through 22, wherein the method further comprises: determining, by the processor, based on the location signal, a calibration offset; and determining, by the processor, based on the first calibration map and the calibration offset, the second calibration map.

Clause 24. The method of any one of clauses 20 through 23, wherein the memory is configured to store a third calibration map, wherein the method further comprises: determining, by the processor, based on the location signal, a calibration offset; and determining, by the processor, based on the first calibration map, the third calibration map and the calibration offset, the second calibration map.

Clause 25. The method of any one of clauses 20 through 24, wherein the method further comprises: determining, by the processor, based on the location signal, a region code; and determining, by the processor, based on the region code, the second calibration map.

While the disclosure has been described in connection with what is presently considered to be the most practical and preferred embodiments, it is to be understood that the disclosure is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A recreational vehicle, comprising:
a two-stroke engine comprising an exhaust assembly having an exhaust valve configured to adjust an orifice size defined by the exhaust valve and at least a portion of an exhaust port of the two-stroke engine; and
an engine control unit (ECU) including a processor and a memory device configured to store a first calibration map defining, based on at least a throttle position and an engine speed of the two-stroke engine, a first exhaust valve position, wherein the processor is configured to:
receive a location signal indicative of a location of the recreational vehicle;
determine, based on the location signal, a second calibration map defining, based on the throttle position and the engine speed, a second exhaust valve position different from the first exhaust valve position; and
control the two-stroke engine to operate the exhaust valve at the second exhaust valve position.

2. The recreational vehicle of claim 1, further comprising:
an engine speed sensor configured to generate an engine speed signal indicative of revolutions per minute of the two-stroke engine, wherein the ECU is configured to receive the engine speed signal; and
a throttle position sensor configured to generate a throttle signal indicative of an input from an operator-actuated throttle device, wherein the ECU is configured to receive the throttle signal,
wherein the processor is configured to determine, based on the second calibration map, the throttle signal, and the engine speed signal, the second exhaust valve position.

3. The recreational vehicle of claim 1, further comprising an electronic actuator communicatively coupled to the processor and mechanically coupled to the exhaust valve,
wherein the processor is configured to generate an exhaust valve position signal indicative of the second exhaust valve position, and
wherein the electronic actuator is configured to receive from the processor the exhaust valve position signal and cause the exhaust valve to move to the second exhaust valve position to control the two-stroke engine to operate the exhaust valve at the second exhaust valve position.

4. The recreational vehicle of claim 1, wherein the processor is configured to:
determine, based on the location signal, a calibration offset; and
determine, based on the first calibration map and the calibration offset, the second calibration map.

5. The recreational vehicle of claim 1, wherein the memory is further configured to store a third calibration map, and wherein the processor is configured to:
determine, based on the location signal, a calibration offset; and
determine, based on the first calibration map, the third calibration map and the calibration offset, the second calibration map.

6. The recreational vehicle of claim 1, wherein the processor is configured to:
determine, based on the location signal, a region code; and
determine, based on the region code, the second calibration map.

7. The recreational vehicle of claim 1, wherein the first calibration map and the second calibration map define respective first and second exhaust valve positions comprising:
   an exhaust valve open position;
   an exhaust valve closed position; and
   an exhaust valve mid-position, wherein the mid-position is between the open position and the closed position.

8. The recreational vehicle of claim 7, wherein the orifice size is at a maximum when the exhaust valve is in the open position, wherein the orifice size is at a minimum when the exhaust valve is in the closed position, and wherein the orifice size is between the maximum orifice size and the minimum orifice size when the exhaust valve is in the mid-position.

9. The recreational vehicle of claim 1, further comprising a locator device configured to determine, based on one or more communications signals received from one or more remote devices, the location signal, wherein the ECU is configured to receive from the locator device the location signal.

10. The recreational vehicle of claim 1, further comprising a locator device configured to determine, based on one or more detected velocity changes and one or more detected directional changes, the location signal, wherein the ECU is configured to receive from the locator device the location signal.

11. A two-stroke engine control system for a recreational vehicle, comprising:
   a locator device configured to generate location signal indicative of a location of the recreational vehicle;
   a throttle position sensor configured to generate a throttle signal indicative of an input from an operator-actuated throttle device;
   an engine speed sensor configured to generate an engine speed signal indicative of revolutions per minute of a two-stroke engine including a cylinder defining a combustion chamber and an exhaust port and an exhaust assembly including an exhaust valve configured to adjust an orifice size defined by the exhaust valve and at least a portion of the exhaust port; and
   an engine control unit (ECU) including a processor and a memory device storing a first calibration map defining, based on at least the throttle signal and the engine speed signal, a first exhaust valve position, wherein the processor is configured to:
      receive the location signal, the throttle signal, and the engine speed signal;
      determine, based on the location signal, a second calibration map;
      determine, based on the second calibration map, the throttle signal, and the engine speed signal, a second exhaust valve position; and
      control the two-stroke engine to operate the exhaust valve at the second exhaust valve position.

12. The two-stroke engine control system of claim 11, further comprising an electronic actuator communicatively coupled to the processor, wherein the processor is configured to generate a second exhaust valve position signal indicative of the second exhaust valve position, and wherein the electronic actuator is configured to receive from the processor the exhaust valve position signal and cause the exhaust valve to move to the second exhaust valve position to control the two-stroke engine to operate the exhaust valve at the second exhaust valve position.

13. The two-stroke engine control system of claim 11, wherein the processor is configured to:
   determine, based on the location signal, a calibration offset; and
   determine, based on the first calibration map and the calibration offset, the second calibration map.

14. The two-stroke engine control system of claim 11, wherein the memory is further configured to store a third calibration map, and wherein the processor is configured to:
   determine, based on the location signal, a calibration offset; and
   determine, based on the first calibration map, the third calibration map and the calibration offset, the second calibration map.

15. The two-stroke engine control system of claim 11, wherein the processor is configured to:
   determine, based on the location signal, a region code; and
   determine, based on the region code, the second calibration map.

16. The two-stroke engine control system of claim 11, wherein the first calibration map and the second calibration map define respective first and second sets of exhaust valve positions, each set of exhaust valve positions comprising:
   an exhaust valve open position;
   an exhaust valve closed position; and
   an exhaust valve mid-position, wherein the mid-position is between the open position and the closed position.

17. The two-stroke engine control system of claim 16, wherein the orifice size is at a maximum when the exhaust valve is in the open position, wherein the orifice size is at a minimum when the exhaust valve is in the closed position, and wherein the orifice size is between the maximum orifice size and the minimum orifice size when the exhaust valve is in the mid-position.

18. The two-stroke engine control system of claim 11, further comprising a locator device configured to determine, based on one or more communications signals received from one or more remote devices, the location signal, wherein the ECU is configured to receive from the locator device the location signal.

19. The two-stroke engine control system of claim 11, further comprising a locator device configured to determine, based on one or more detected velocity changes and one or more detected directional changes, the location signal, wherein the ECU is configured to receive from the locator device the location signal.

20. A method of controlling a two-stroke engine of a recreational vehicle, comprising:
   receiving, by a processors of an engine control unit, a location signal indicative of a location of the recreational vehicle, a throttle signal indicative of an input from an operator-actuated throttle device, and an engine speed signal indicative of revolutions per minute of the two-stroke engine having an exhaust valve configured to adjust an orifice size defined by the exhaust valve and at least a portion of an exhaust port of the two-stroke engine;
   receiving, by the processor from a memory device, a first calibration map defining, based on at least the throttle signal and the engine speed signal, a first exhaust valve position;
   determining, by the processor based on the location signal, a second calibration map;
   determining, by the processor based on the second calibration map, the throttle signal, and the engine speed signal, a second exhaust valve position; and controlling, by the processor, the two-stroke engine to operate the exhaust valve at the second exhaust valve position.

\* \* \* \* \*